US008918934B2

(12) United States Patent
Roma et al.

(10) Patent No.: US 8,918,934 B2
(45) Date of Patent: Dec. 30, 2014

(54) LINKED COIL MATTRESS ASSEMBLY

(71) Applicant: Otis Bed Manufacturing Company, Inc., Buffalo, NY (US)

(72) Inventors: John K. Roma, Orchard Park, NY (US); Timothy D. DeBoy, Cheektowaga, NY (US)

(73) Assignee: Otis Bed Manufacturing Company, Inc., Buffalo, NY (US)

( * ) Notice: Subject to any disclaimer, the term of this patent is extended or adjusted under 35 U.S.C. 154(b) by 0 days.

(21) Appl. No.: 13/863,416

(22) Filed: Apr. 16, 2013

(65) Prior Publication Data

US 2013/0276239 A1     Oct. 24, 2013

Related U.S. Application Data

(60) Provisional application No. 61/635,088, filed on Apr. 18, 2012.

(51) Int. Cl.
| | |
|---|---|
| *A47C 23/04* | (2006.01) |
| *F16F 3/04* | (2006.01) |
| *A47C 27/06* | (2006.01) |
| *A47C 27/14* | (2006.01) |
| *A47C 27/20* | (2006.01) |
| *A47C 27/15* | (2006.01) |

(52) U.S. Cl.
CPC . *A47C 23/04* (2013.01); *F16F 3/04* (2013.01); *A47C 27/064* (2013.01); *A47C 27/065* (2013.01); *A47C 27/144* (2013.01); *A47C 27/20* (2013.01); *A47C 27/15* (2013.01)
USPC ............... 5/717; 5/716; 5/718; 5/720; 5/721; 5/740

(58) Field of Classification Search
CPC ...... A47C 27/04; A47C 27/05; A47C 27/056; A47C 23/00; A47C 27/064; A47C 27/14; A47C 23/002; A47C 23/04; A47C 27/06; A47C 27/15; A47C 23/30; A47C 23/063; B29L 2031/751; B68G 7/054; B21F 33/04
USPC ...................... 5/716, 717, 718, 720, 721, 740
See application file for complete search history.

(56) References Cited

U.S. PATENT DOCUMENTS

| | | | | |
|---|---|---|---|---|
| 698,529 | A * | 4/1902 | Marshall | 5/720 |
| 1,270,840 | A * | 7/1918 | Kelly | 5/655.8 |
| 1,682,394 | A * | 8/1928 | Meutsch | 5/720 |
| 1,745,986 | A * | 2/1930 | Edwards | 5/717 |
| 1,959,082 | A * | 5/1934 | Lofman | 5/717 |
| 2,236,007 | A * | 3/1941 | Oldham | 267/93 |
| 2,615,180 | A * | 10/1952 | Woller | 5/720 |
| 3,046,574 | A * | 7/1962 | Erenberg et al. | 5/717 |
| 3,080,578 | A * | 3/1963 | Novascone | 5/720 |
| 3,082,438 | A * | 3/1963 | Nachman, Jr. | 5/717 |

(Continued)

*Primary Examiner* — William Kelleher
*Assistant Examiner* — Duoni Pan
(74) *Attorney, Agent, or Firm* — Hodgson Russ LLP

(57) ABSTRACT

A mattress assembly may include a foam frame, an inner assembly within the foam frame, the inner assembly including a foam core and a pocketed coil assembly. The pocketed coil assembly can include a plurality of individual pocketed coil springs having a height. Each coil spring may be joined together to a neighboring coil spring such that at least a majority of the height of each coil spring is configured to vertically deflect without deflecting the joined neighboring coil spring.

19 Claims, 4 Drawing Sheets

(56) References Cited

U.S. PATENT DOCUMENTS

| | | | |
|---|---|---|---|
| 3,099,021 A * | 7/1963 | Wetzler | 5/718 |
| 3,178,735 A * | 4/1965 | Thompson et al. | 5/720 |
| 3,230,558 A * | 1/1966 | Duncan | 5/720 |
| 3,462,779 A * | 8/1969 | Thompson | 5/655.8 |
| 4,462,129 A * | 7/1984 | Brannock | 5/717 |
| 5,724,686 A * | 3/1998 | Neal | 5/717 |
| 5,787,532 A * | 8/1998 | Langer et al. | 5/717 |
| 6,249,924 B1 * | 6/2001 | Kluft | 5/716 |
| 6,295,676 B1 * | 10/2001 | Warner | 5/720 |
| 6,353,952 B1 * | 3/2002 | Wells | 5/716 |
| 6,813,791 B2 * | 11/2004 | Mossbeck et al. | 5/720 |
| 6,826,796 B1 * | 12/2004 | Mossbeck | 5/720 |
| 6,889,398 B2 * | 5/2005 | Lewis | 5/716 |
| 6,996,865 B2 | 2/2006 | Sabin | |
| 7,082,635 B2 * | 8/2006 | Barman et al. | 5/717 |
| 7,617,788 B2 * | 11/2009 | Rensink | 112/475.08 |
| 7,640,611 B1 * | 1/2010 | Kluft | 5/716 |
| 7,644,461 B2 * | 1/2010 | Lee | 5/720 |
| 7,917,980 B2 * | 4/2011 | Kluft | 5/717 |
| 7,992,242 B2 * | 8/2011 | Antinori | 5/727 |
| 2004/0237204 A1 * | 12/2004 | Antinori | 5/716 |
| 2006/0260062 A1 * | 11/2006 | Barman et al. | 5/717 |
| 2007/0204407 A1 * | 9/2007 | Lee | 5/720 |
| 2009/0193591 A1 * | 8/2009 | DeMoss et al. | 5/716 |
| 2010/0192299 A1 * | 8/2010 | Schermel et al. | 5/421 |
| 2010/0223732 A1 * | 9/2010 | Allman et al. | 5/717 |
| 2010/0319137 A1 * | 12/2010 | Witherell et al. | 5/717 |
| 2011/0061163 A1 * | 3/2011 | Lee | 5/93.1 |
| 2013/0192003 A1 * | 8/2013 | Demoss et al. | 5/716 |

* cited by examiner

LINKED COIL MATTRESS ASSEMBLY

CROSS-REFERENCE TO RELATED APPLICATIONS

This application claims the benefit of priority to U.S. provisional patent application Ser. No. 61/635,088 filed Apr. 18, 2012, the disclosure of which is incorporated herein by reference in its entirety.

FIELD

The present disclosure relates generally to mattresses, and more particularly to a pocketed coil spring assembly for mattresses.

BACKGROUND

Previous pocketed coil spring assemblies include a number of discrete coil springs, each of which is enclosed in a fabric pocket in a length of folded fabric material. Longitudinal axes of the spring coils are generally parallel with one another so that the top and bottom end turns of the coil springs define top and bottom faces of the spring unit. These spring assemblies can be fabricated by forming rows of the pocketed coil springs and binding or adhering the individual rows together.

Individual pocketed springs are typically secured to adjacent pocketed springs by an adhesive, an ultrasonic weld, or a mechanical fastener near the top or over substantial portion of the longitudinal axes of the joined springs. However, these fastening techniques cause shearing force within the fabric pockets, which reduce the freedom of movement of individual coils when the coils are compressed. This influences the vertical restoring force of the coil springs, thereby interfering with mechanical equilibrium of the mattress. Furthermore, these fastening techniques can add cost and complexity to the manufacture of a coil spring assembly.

Therefore, there is a need for an improved pocketed coil spring mattress assembly.

SUMMARY

In one embodiment, a mattress assembly may include a foam frame, an inner assembly within the foam frame, the inner assembly including a foam core and a pocketed coil assembly. The pocketed coil assembly can include a plurality of individual pocketed coil springs having a height. Each coil spring may be joined together to a neighboring coil spring such that at least a majority of the height of each coil spring is configured to vertically deflect without deflecting the joined neighboring coil spring.

In a second embodiment, a method of making a mattress can include providing a foam frame, a plurality of pocketed coil springs, and a foam core. A coil assembly can be assembled by joining the string to a frame. A coil spring can be joined from the plurality of pocketed coil springs to a neighboring coil spring of the plurality of pocketed coil springs such that at least a majority of the height of the coil spring is configured to vertically deflect without deflecting the joined neighboring coil spring. The coil assembly can be placed within the foam frame. A foam core may be placed within the foam frame, the foam frame being above the coil assembly.

In another embodiment, a pocketed coil assembly for a mattress may include a fabric sleeve and a plurality of coil springs spaced apart at regular intervals within the fabric sleeve. The plurality of coil springs can be joined to neighboring coil springs of the plurality of coil springs only at a bottom portion of each coil spring of the plurality of coil springs thereby allowing each coil spring to vertically deflect without deflecting another of the plurality of coil springs. A rigid frame may be provided about a perimeter of the plurality of coil springs, the frame being only joined to the bottom portion of at least several of the plurality of coil springs

DETAILED DESCRIPTION

Figure 1:
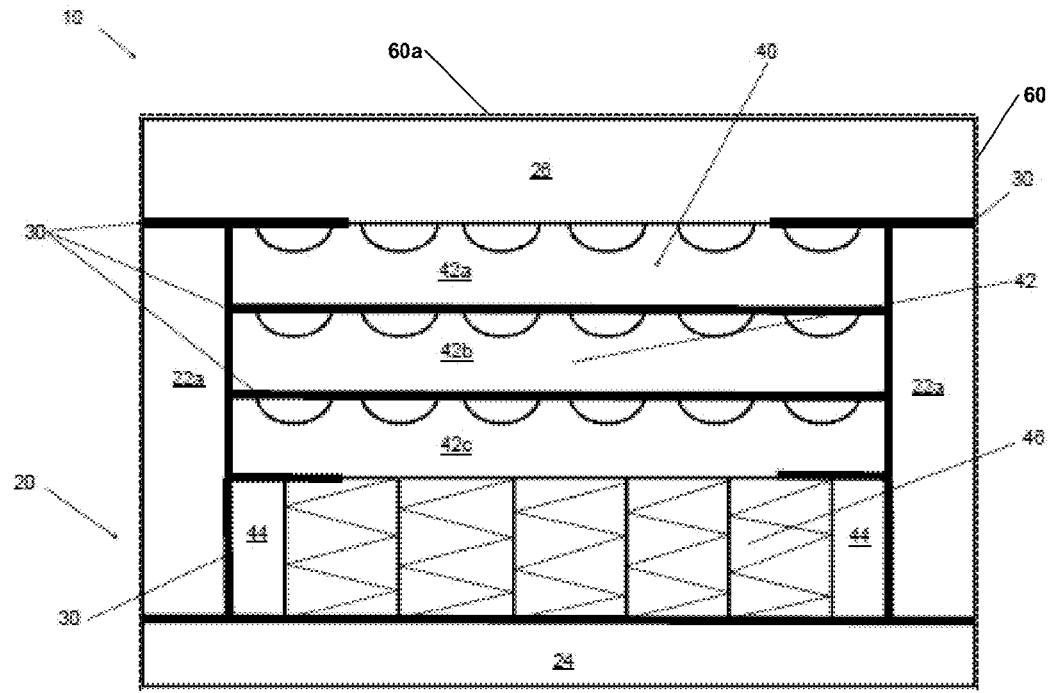
FIG. 1 is a cross-sectional view of a linked coil mattress assembly formed in accordance with an embodiment of the present disclosure.

FIG. 1. shows a cross-sectional view of a mattress formed in accordance with an embodiment of the present disclosure. Mattress 10 generally comprises a foam frame 20 and an inner assembly 40. The inner assembly 40 includes a foam core 42, steps 44, and a pocketed coil assembly 46. A stretchable fire retardant fabric 60, shown in dashed lines in FIG. 1, can cover the foam frame 20 and inner assembly 40. In one embodiment of the present disclosure, the surface area of the fabric 60 covering the foam frame 20 is larger than the surface being covered, such that the ratio of fabric 60 surface area to foam frame 20 surface area is a ratio greater than 1:1. In this embodiment ½ wide elastic banding is used to maintain a snug fit between the fabric 60 and the outer surface of the foam frame. Alternatively, the fabric 60 can be stitched to the outer surface of the foam frame. By maintaining a ratio greater than 1:1, shearing force on the upper sleep surface 60a can be reduced.

In an alternative embodiment, only the top surface 60a is made of a stretchable fire retardant fabric, while the remaining fabric 60 is a non-stretchable fire retardant fabric. In this embodiment, the surface area of the fabric on the top surface 60a surface may be larger than the surface area of the foam frame 20 being covered, and the remaining fabric 60 can be approximately sized to the surface area of the foam frame 20.

Figure 2:
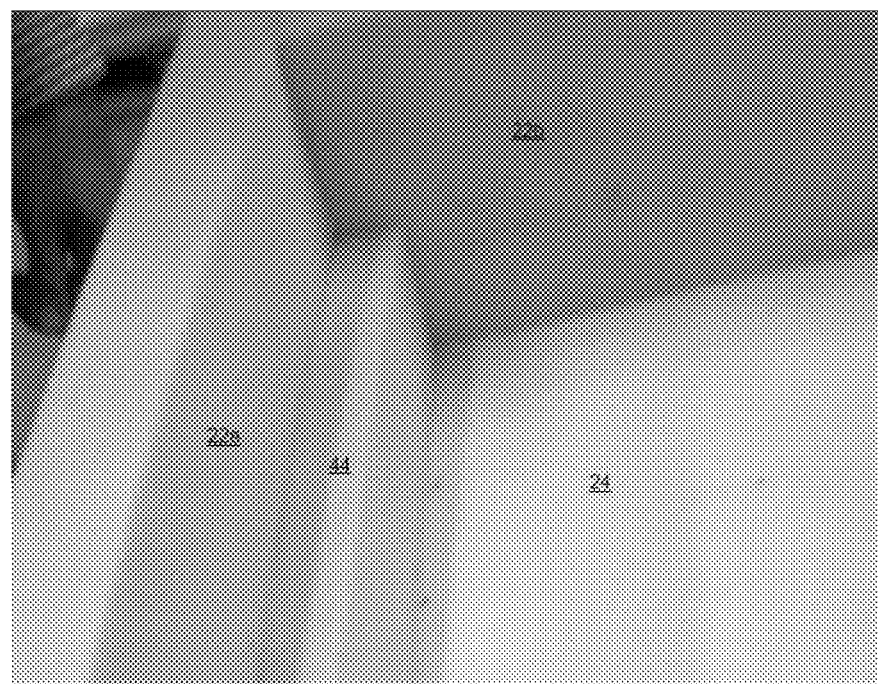
FIG. 2 is a detailed perspective view of a portion of the mattress shown in FIG. 1.

Additional reference is made now to FIG. 2. Foam frame 20 may include a pair of opposed foam side walls 22a and a pair of opposed foam end walls 22b adhered to a base layer 24, and a foam top layer 26 adhered to side walls 22a and end walls 22b, such that foam frame defines a hollow core for receiving the inner assembly 40. It is advantageous to use extra-firm foam, such as 2.1 pound density, 55 ILD (Indentation Load Deflection) foam, so that the mattress returns to its original size after being rolled and vacuum-sealed for shipping. By way of non-limiting example, base layer 24 may be 2" (5.08 cm) thick; side walls 22a and end walls 22b may be 4" (10.16 cm) thick by 6" (15.24 cm) high; and top layer 26 may be 1.5" (3.81 cm) thick convoluted foam. The constituent parts of foam frame 20 may be fixed to one another using a water-based adhesive 30, shown in bolded lines in FIG. 1.

Figure 3:
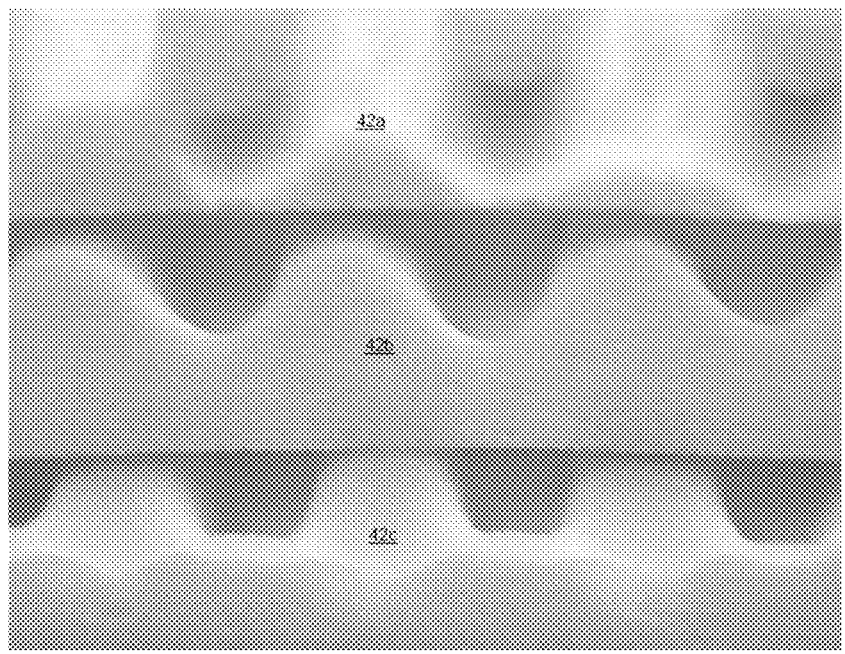
FIG. 3 is a side view of a foam core in accordance with an embodiment of the present disclosure.
Figure 4:
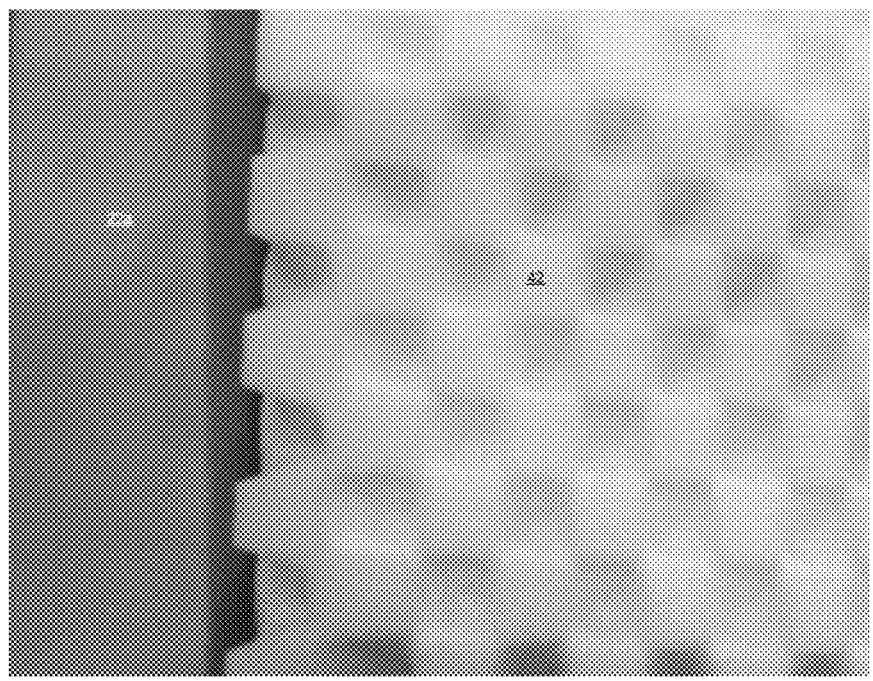
FIG. 4 is a top view of the foam core shown in FIG. 3 against a side wall of a foam frame in accordance with an embodiment of the present disclosure.

The inner assembly 40 can include a foam core 42, steps 44, and a pocketed coil assembly 46. In the embodiment shown in FIG. 2, the foam step 44 may be at least 1½" wide by 3" tall and adhered to side walls 22a and end walls 22b. The foam step 44 can be made of the same foam as the side walls 22a and end walls 22b. The pocketed coil assembly 46 may be adhered to base layer 24 with adhesive 30, and placed between steps 44. The foam core 42 can be located above the pocketed coil assembly 46, and between side walls 22a and end walls 22b. As shown in FIG. 3, the foam core 42 may be constructed of a plurality of foam layers 42a, 42b, 42c adhered to one another with an adhesive 30. The plurality of foam layers 42a, 42b, 42c, may, for example be three layers of 1.5" roller crushed box-cut foam. FIG. 4 shows a detailed top view of roller crushed box-cut foam core 42, placed beside a side wall 22a. In one embodiment, part of the bottom of the foam core 42 is adhered to steps 44 and/or part of the pocketed coil assembly with adhesive 30. In one example, from 5" to 8" of the outer lateral edges of foam core 42 may be adhered to steps 44 and/or part of the pocketed coil assembly 46. In another example, two strips of adhesive, 6" wide are placed along the two lateral edges of the foam core 42, such that the steps 44 and part of the pocketed coil assembly 46 is adhered to the foam core. Once the inner assembly 40 is assembled, the foam top layer 26 may enclose the inner assembly 40 within the foam frame 20. In one embodiment, from about 5" to about 10", and preferably about 8", of the outer perimeter of the top layer 26 is glued to side walls 22a, end walls 22b, and an outer portion of the perimeter of foam core 42. This may be done, for example, by double gluing a tape layer between top layer 26, foam layer 42a, side walls 22a, and end walls 22b. Alternatively, the tape layer can extend around sidewalls 22a and end walls 22b, such that the tape layer is between walls 22a, 22b and top layer 26, and runs downwardly along the outside edge of 22a, 22b. In another embodiment the height of foam layers 42, 42b, and 42c are adhered to side walls 22 and end walls 22b.

Figure 5:
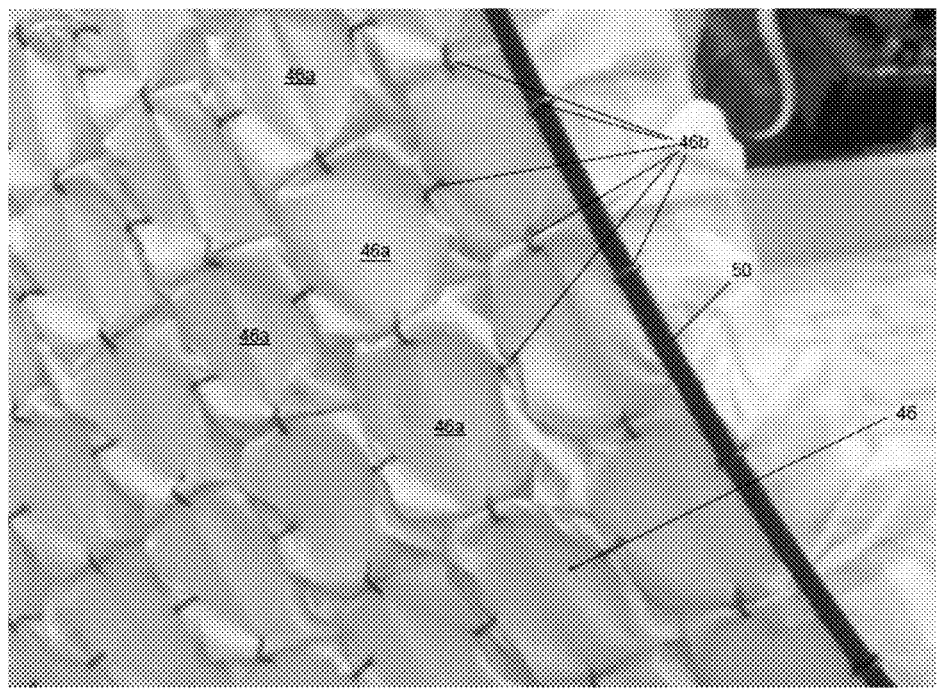
FIG. 5 is a perspective view of an underside of a pocketed coil assembly according to an embodiment of the present disclosure.
Figure 6:
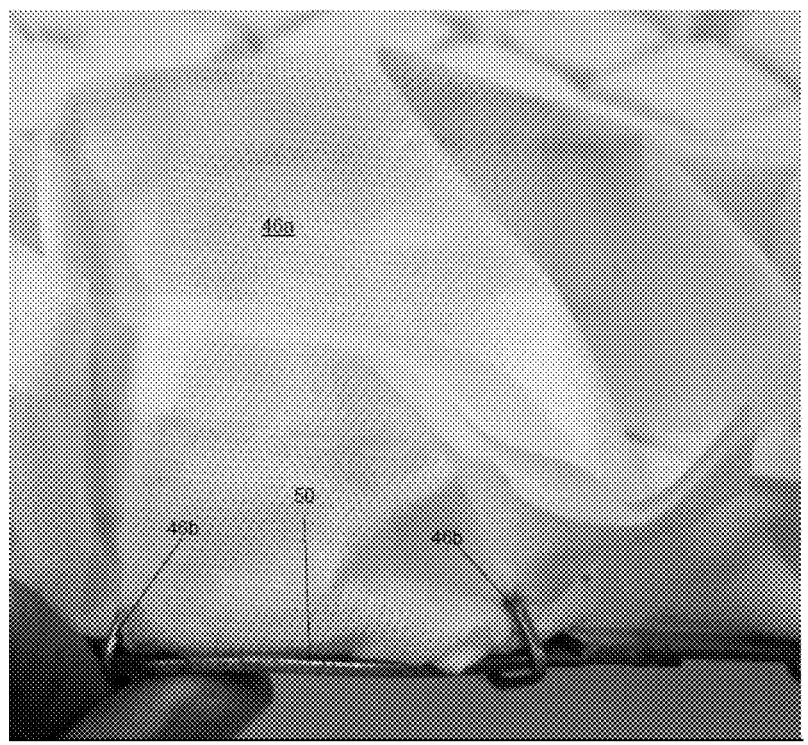
FIG. 6 is side detail view of a portion of the pocketed coil assembly shown in FIG. 5.
Figure 7:
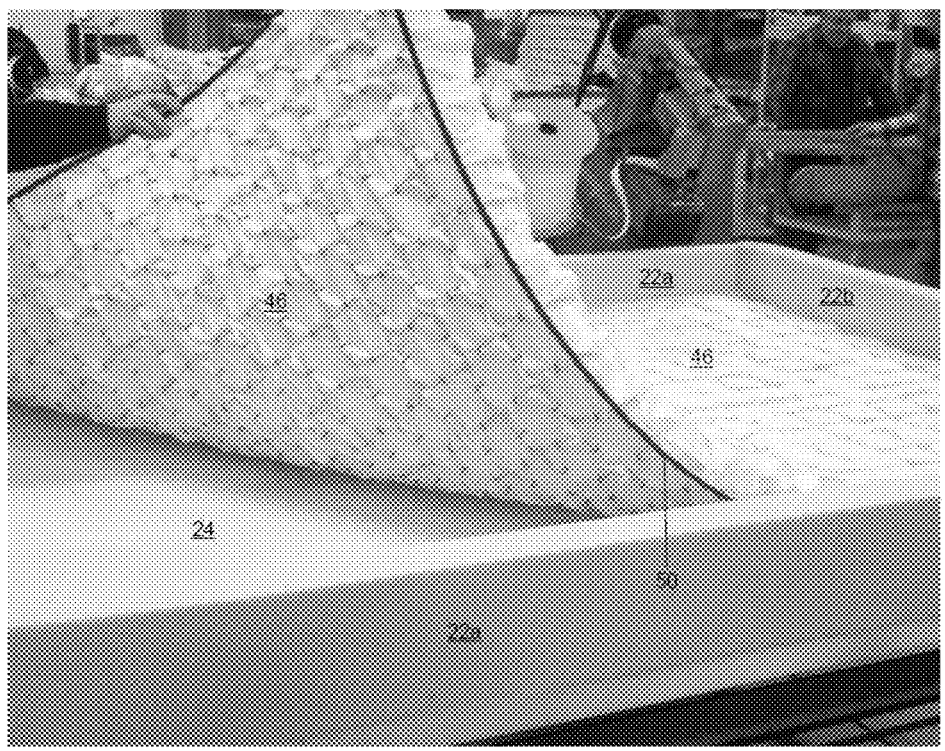
FIG. 7 is a perspective view of a partially constructed mattress shown in FIG. 1.

Referring to FIGS. 5 and 6, the pocketed coil assembly 46 may be formed from a plurality of individual pocketed coil springs 46a. Each pocketed coil 46a may be sized 3" by 3" by 3", however, other sized pocketed coil springs 46a may be used. According to one embodiment, pocketed coil assembly 46 may be a rectangular grid of coil springs 46a that is 24 springs in length by 17 springs in width. To create a grid, a bottom portion of each pocketed coil 46a is linked to adjoining pocketed coils 46a. By adjoining the pocketed coils 46a only at a bottom portion, the coil springs 46a have complete, or close to complete, freedom of vertical deflection relative to adjoining pocketed coils 46a. In other words, compressing one pocketed coil 46a will not cause another pocketed coil 46a to compress, or resist compressing. Additionally, displacing the fabric pockets of the pocketed coils 46a will not affect the fabric pockets of neighboring pocketed coils 46a. Excess fabric between pocketed coils 46 or stretchable fabric may be used to facilitate freedom of movement of the fabric pockets, such that displacing the fabric pockets of the pocketed coils 46a will not affect the fabric pockets of neighboring pocketed coils 46a. Alternatively, the pocketed coils 46a can be linked at a location above the bottom portion of the pocketed coil 46a, so that at least a majority of the height of the coil spring 46a can vertically deflect without affecting neighboring coil springs 46a.

The pocketed coils 46a may be linked to adjacent pocketed coils 46a in a number of ways, such as by an adhesive, an ultrasonic weld, or a mechanical fastener. For example, the embodiment shown in FIGS. 5 and 6, uses hog rings 46b to fasten the nearest adjoining edges of each pocketed coil 46a. A frame 50 can be used to provide support for the pocketed coil springs 46a, to maintain a gridded formation of coil springs 46a. For example, frame 50 can be provided around the perimeter of the coil springs 46a, which the outermost coil springs 46a can be linked to. In one embodiment, the frame 50 is a flat wire, which surrounds the perimeter of the coil assembly 46. In this embodiment, the outermost coil springs 46 are linked to the frame 50 using hog rings 46b. Other frame shapes or configurations can also be used to provide support to the coil assembly 46. In other embodiments of the present disclosure, a frame is not provided.

The pocketed coil assembly 46 can be formed by linking a string of pocketed coils 46a to a frame 50. The strings can be a line of individual pocketed coils 46a whose fabric pockets are linked to one another. For example, the pocketed coil assembly 46 can be assembled by linking a first string of pocketed coils 46 a to a frame 50, such that the string forms a line of pocketed coils 46a along the frame 50. In one embodiment, the pocketed coils 46a of a string are linked prior to linking the string to the frame 50. Subsequent strings of pocketed coils 46a can be linked to the frame, side by side relative to previous strings, until the frame is filled with pocketed coils 46a. Once the frame is filled with pocketed coils 46a, pocketed coils 46a in adjacent strings can be linked to each other to form the pocketed coil assembly 46. In one particular embodiment, a string of 24 pocketed coils 46a form a single column, and 17 strings are linked side by side to form the pocketed coil assembly 46. In another embodiment, a string of 17 pocketed coils 46a form a row, and 24 strings form the pocketed coil assembly 46.

The foam core 42 may be work-softened to remove stresses in the foam, thereby increasing open-cell content of the foam. For example, the foam core 42 can be placed in a bag and be placed under vacuum (negative) pressure to collapse the foam core 42 in multiple directions. In another embodiment, the foam core 42 is pressed by a vertical press machine to work soften the foam. Pressing can be repeated to achieve a desired level of softening. In yet another embodiment, the foam core 42 can be pressed in the press machine after the foam core 42 is exposed to negative vacuum pressure. Alternatively, the foam core 42 can be pressed concurrently, when, negative pressure is applied.

The present disclosure may also be embodied as a method of constructing a linked coil assembly mattress. The method may include adhering foam side walls and a pair of opposed foam end walls to a base layer. Two steps may be placed adjacent the side walls and adhered to the side walls. A linked coil assembly may be placed between the steps. A foam core can be provided, and an adhesive can be placed on outer lateral edges of the foam core such that the steps and an outer portion of the linked coil assembly are adhered to the foam core. A topper can be provided, and an adhesive can be placed on outer lateral edges of the topper, such that the side walls and an outer portion of the foam core is adhered to the topper.

The present disclosure may also be embodied as a method of constructing a linked pocketed coil assembly. A plurality of strings of commercially available pocketed coils, whose fabric pockets are attached to one another, can be provided. The pocketed coils in each of the plurality of strings may be linked to one another only at a bottom portion of each of the pocketed coils. The plurality of strings can be linked to a frame until the frame is filled with laterally aligned strings. Pocketed coils of adjacent strings may be linked to one another to form the linked pocketed coil assembly.

The mattress 10 of the present disclosure reduces shear stresses, which may be caused by the uneven distribution of a user's weight. The mattress 10 of the present disclosure advantageously is tuft-free and quilt-free, thereby removing tension on the outer fabric 60.

According to another embodiment of the present disclosure, a tufted linked coil mattress assembly is provided, similar to the linked coil mattress 10 described above. However, the components of the tufted mattress assembly are tufted together. In this embodiment, less adhesive is used than the embodiment described above. More particularly, the foam top layer 26 is not glued to the foam core 42. Additionally, the foam core 42 is not glued to the coil assembly 46. Two convoluted foam layers may be used as the foam core 42, the layers do not have to be adhered together as the tufts hold the foam in position. In this embodiment, a tuftable super stretch interlocked knit fabric can be used for the outer fabric to eliminate the stresses associated by tuftable non-stretch fabric.

Modifications and other embodiments of the disclosure set forth herein will be apparent to one skilled in the art to which the disclosure pertains in light of teachings presented in the present specification. Therefore, the disclosure is not to be limited to the specific embodiments disclosed, and modifications and other embodiments are intended to be included.

What is claimed is:

1. A mattress assembly, comprising:
   a foam frame including a base layer;
   an inner assembly within the foam frame, the inner assembly including a foam core and a pocketed coil assembly, the pocketed coil assembly being located between the base layer and the foam core, and the pocketed coil assembly being in direct contact with the foam core;
   a rigid frame joined to the pocketed coil assembly about a perimeter of the pocketed coil assembly;
   wherein the pocketed coil assembly includes a plurality of individual pocketed coil springs having a height and a width, each coil spring joined together to a neighboring coil spring such that at least a majority of the height of each coil spring is vertically deflectable without deflecting the joined neighboring coil spring;
   wherein the height of each coil spring is less than or equal to the width of each coil spring.

2. The mattress assembly of claim 1, wherein each coil spring is joined to the neighboring coil spring below a midpoint of each of the joined coil springs.

3. The mattress assembly of claim 2, wherein each coil spring is joined to a neighboring coil spring at a bottom portion of each of the joined coil springs.

4. The mattress assembly of claim 1, wherein the plurality of individual pocketed coil springs are spaced apart from one another such that excess fabric is provided between the plurality of individual pocketed coil springs to allow each coil spring to vertically deflect without deflecting the neighboring coil spring.

5. The mattress assembly of claim 1, wherein each of the plurality of individual pocketed coil springs is encased in a stretchable fabric pocket.

6. The mattress assembly of claim 1, wherein each pocketed coil spring of the plurality of individual pocketed coil springs has a diameter of 3" and a height of 3".

7. The mattress assembly of claim 1, wherein the joined coil springs are joined by one or more of the following: an adhesive, an ultrasonic weld, and a mechanical fastener.

8. The mattress assembly of claim 1, wherein the foam core is work-softened to increase open-cell content of the foam core.

9. The mattress assembly of claim 1, wherein the foam frame includes a pair of opposed foam side walls and a pair of opposed foam end walls adhered to the base layer, and includes a foam top layer adhered to side walls and end walls.

10. The mattress assembly of claim 9, wherein the inner assembly includes foam steps having a height, the height of the steps being approximately equal to the height of the plurality of coil springs.

11. A method of making a mattress, comprising:
    providing a foam frame, a plurality of pocketed coil springs having a height and a width, and a foam core;
    assembling a coil assembly by:
        joining two or more coil springs of the plurality of pocketed coil springs to a rigid spring assembly frame;
        joining a coil spring from the plurality of pocketed coil springs to a neighboring coil spring of the plurality of pocketed coil springs such that at least a majority of the height of the coil spring is vertically deflectable without deflecting the joined neighboring coil spring;
    placing the coil assembly within the foam frame; and
    placing a foam core within the foam frame, the foam frame being above, and in direct contact with, the coil assembly;
    wherein the height of each coil spring is less than or equal to the width of each coil spring.

12. The method of claim 11, wherein the plurality of pocketed coil springs includes a first string of coil springs encased in a first fabric casement and includes a second string of coil springs encased in a second fabric casement; and
    wherein coil springs of the first string are joined to the spring assembly frame prior to joining coil springs of the second string to the coil springs of the first string.

13. The method of claim 12, wherein coil springs of the first string are joined to one another prior to joining the first string to the frame.

14. The method of claim 12, wherein the plurality of pocketed coil springs include additional strings of pocketed coils, the additional strings being joined, side by side, to one another until the spring assembly frame is filled with the plurality of pocketed coil springs.

15. The method of claim 14, wherein, the additional strings are joined to the spring assembly frame prior to joining coil springs of the additional strings to one another.

16. The method of claim 11, wherein the two or more coil springs are joined below a midpoint of the height of each coil spring.

17. The method of claim 16, the two or more coil springs are joined at a bottom portion of each coil spring.

18. The method of claim 11, further comprising work-softening the foam core to thereby increase open-cell content of the foam core.

19. A pocketed coil assembly for a mattress, comprising:
    a fabric sleeve;
    a plurality of coil springs spaced apart at regular intervals within the fabric sleeve, the plurality of coil springs being joined to neighboring coil springs of the plurality of coil springs only at a bottom portion of each coil spring of the plurality of coil springs thereby allowing each coil spring to vertically deflect without deflecting another of the plurality of coil springs;
    a rigid frame about a perimeter of the plurality of coil springs only joined to the bottom portion of at least several of the plurality of coil springs;
    wherein each of the plurality of coil springs have a height and width, the height of each coil spring being less than or equal to the width of each coil spring;

wherein the joined coil springs are joined by one or more of the following: an adhesive, an ultrasonic weld, and a mechanical fastener.

\* \* \* \* \*